(12) United States Patent
Aubineau et al.

(10) Patent No.: US 11,250,168 B2
(45) Date of Patent: Feb. 15, 2022

(54) MICROCONTROLLER AND POWER SUPPLY

(71) Applicant: NXP B.V., Eindhoven (NL)

(72) Inventors: Vincent Aubineau, Romorantin-Lanthenay (FR); Michael Andreas Staudenmaier, Munich (DE); Pierre Juste, Montigny le Bretonneux (FR)

(73) Assignee: NXP B.V., Eindhoven (NL)

( * ) Notice: Subject to any disclaimer, the term of this patent is extended or adjusted under 35 U.S.C. 154(b) by 89 days.

(21) Appl. No.: 16/813,805

(22) Filed: Mar. 10, 2020

(65) Prior Publication Data

US 2020/0327259 A1  Oct. 15, 2020

(30) Foreign Application Priority Data

Apr. 12, 2019 (EP) .................................... 19305481

(51) Int. Cl.
*G06F 1/26* (2006.01)
*G06F 21/81* (2013.01)
(Continued)

(52) U.S. Cl.
CPC .............. *G06F 21/81* (2013.01); *G06F 21/44* (2013.01); *G06F 21/6218* (2013.01); *G06F 21/83* (2013.01); *H04L 9/3271* (2013.01)

(58) Field of Classification Search
CPC ...... G06F 21/44; G06F 21/6218; G06F 21/81; G06F 21/83; H04L 9/3271
See application file for complete search history.

(56) References Cited

U.S. PATENT DOCUMENTS 8,667,265 B1 * 3/2014 Hamlet ................. H04L 9/0866
713/150
9,143,876 B2 * 9/2015 Kropfitsch ........... H04R 29/004
(Continued)

FOREIGN PATENT DOCUMENTS

CN  107462827 A  12/2017
EP    2982997 A1  10/2016
EP    3722979 A1  10/2020

OTHER PUBLICATIONS

Wikipedia, "Galois/Counter Mode", downloaded from https://en.wikipedia.org/wiki/Galois/Counter_Mode Jan. 8, 2020, 8 pages.
(Continued)

*Primary Examiner* — Gary S Gracia

(57) ABSTRACT

A microcontroller comprising a first integrated circuit configured to receive power from a power supply comprising a second integrated circuit via at least one power input terminal and wherein at least one communication terminal provides for communication between the microcontroller and the power supply, wherein the microcontroller is configured to provide for encrypted communication between the power supply and the microcontroller based on a pre-shared encryption key, the encrypted communication configured to provide for authentication of the identity of the power supply and, if the power supply passes the authentication, the microcontroller is configured to operate in a normal mode and receive said power from the power supply, and if the power supply fails authentication, the microcontroller is configured to enter a tamper mode.

20 Claims, 2 Drawing Sheets

(51) Int. Cl.
*G06F 21/44* (2013.01)
*G06F 21/62* (2013.01)
*G06F 21/83* (2013.01)
*H04L 9/32* (2006.01)
*G06F 11/00* (2006.01)

(56) References Cited

U.S. PATENT DOCUMENTS

| | | | | |
|---|---|---|---|---|
| 9,258,129 | B2* | 2/2016 | Walsh | H04L 9/3271 |
| 9,541,603 | B2* | 1/2017 | Park | G06F 1/28 |
| 9,996,480 | B2* | 6/2018 | Walsh | H04L 9/3242 |
| 2006/0218414 | A1* | 9/2006 | Murray | G06F 21/81 |
| | | | | 713/300 |
| 2009/0292918 | A1* | 11/2009 | Mori | H04L 9/0894 |
| | | | | 713/168 |
| 2011/0010567 | A1* | 1/2011 | Schmitz | G06F 1/3296 |
| | | | | 713/300 |
| 2011/0102136 | A1* | 5/2011 | Nakashima | H04N 5/23241 |
| | | | | 340/5.8 |
| 2012/0044843 | A1* | 2/2012 | Levy | H02J 7/00047 |
| | | | | 370/310 |
| 2012/0046015 | A1* | 2/2012 | Little | H04W 12/06 |
| | | | | 455/411 |
| 2012/0223836 | A1* | 9/2012 | Moller | E05B 47/00 |
| | | | | 340/540 |
| 2013/0271125 | A1* | 10/2013 | Deak | G01R 33/098 |
| | | | | 324/252 |
| 2014/0157174 | A1* | 6/2014 | Deroberts | G06F 3/0484 |
| | | | | 715/771 |
| 2014/0285318 | A1* | 9/2014 | Audeon | B60L 53/305 |
| | | | | 340/5.61 |
| 2015/0048684 | A1* | 2/2015 | Rooyakkers | H01M 10/4257 |
| | | | | 307/65 |
| 2015/0278556 | A1* | 10/2015 | Avni | G06F 21/81 |
| | | | | 726/35 |
| 2015/0346246 | A1* | 12/2015 | Tasher | G01R 19/16552 |
| | | | | 324/762.01 |
| 2016/0224048 | A1* | 8/2016 | Rooyakkers | H02J 7/0047 |
| 2018/0113159 | A1* | 4/2018 | Nastase | H02N 2/142 |
| 2018/0164351 | A1* | 6/2018 | Nirwan | G01R 19/25 |
| 2020/0127503 | A1* | 4/2020 | Kataoka | H02J 7/00034 |

OTHER PUBLICATIONS

Goikoetxea Yanci et al., "Detecting Voltage Glitch Attacks on Secure Devices," 2008 Bio-inspired, Learning and Intelligent Systems for Security, Aug. 4-6, 2008, 6 pages.

U.S. Appl. No. 17/205,042, filed Mar. 18, 2021, 30 pages.

* cited by examiner

MICROCONTROLLER AND POWER SUPPLY

FIELD

The present disclosure relates to microcontroller and a system comprising a power supply and the microcontroller, the microcontroller configured to provide for authentication of the power supply. It also relates to an associated method.

BACKGROUND

It is important that microcontrollers, such as a system on a chip (SoC) device, is secure against malicious attack.

SUMMARY

According to a first aspect of the present disclosure there is provided a microcontroller comprising a first integrated circuit configured to receive power from a power supply comprising a second integrated circuit via at least one power input terminal and wherein at least one communication terminal provides for communication between the microcontroller and the power supply, wherein the microcontroller is configured to provide for encrypted communication between the power supply and the microcontroller based on a pre-shared encryption key, the encrypted communication configured to provide for authentication of the identity of the power supply and, if the power supply passes the authentication, the microcontroller is configured to operate in a normal mode and receive said power from the power supply, and if the power supply fails authentication, the microcontroller is configured to enter a tamper mode.

In one or more embodiments, said microcontroller is configured to request a change to the power provided by the power supply using said encrypted communication and said authentication of the power supply is based on a determination by the microcontroller that the requested change in power has been received over the power supply line.

In one or more embodiments, said microcontroller is configured to make a plurality of said requests at time-spaced intervals during operation in the normal mode.

In one or more embodiments, said microcontroller is configured to make said request independent of the microcontroller requiring a change in the power supplied by the power supply for its operation.

In one or more embodiments, said microcontroller is configured to provide a challenge message to said power supply and receive a response message from the power supply and wherein the validity of the response message to the challenge message provides for said authentication of the power supply.

In one or more embodiments, said microcontroller is configured to send said challenge message at a time of start-up of said microcontroller.

In one or more embodiments, in said normal mode, communication between the microcontroller and the power supply uses said encrypted communication.

In one or more embodiments,
said normal mode comprises the microcontroller operating with a first level of functionality; and
said tamper mode comprises the microcontroller operating with a reduced level of functionality compared to said first level.

In one or more embodiments, in the tamper mode the microcontroller is disabled to prevent its operation at least until said power supply is authenticated.

In one or more embodiments, said microcontroller comprises a system on a chip, SoC.

According to a second aspect of the present disclosure there is provided a system comprising the microcontroller and power supply of the first aspect.

In one or more embodiments, the system comprises an automotive apparatus, the microcontroller configured to provide functionality for said automotive apparatus.

According to a third aspect of the present disclosure there is provided a method of authentication between a microcontroller comprising a first integrated circuit and a power supply comprising a second integrated circuit, the power supply configured to provide power to said microcontroller by at least one power supply line and wherein at least one communication line provides for communication between the power supply and the microcontroller, the method comprising:
providing for, using said communication line, encrypted communication between the power supply and the microcontroller based on a pre-shared encryption key, the encrypted communication configured to provide for authentication of the identity of the power supply and,
if the power supply passes authenticated, operating the microcontroller in a normal mode and receiving, by the microcontroller of said power from the power supply, and
if the power supply fails authentication, causing the microcontroller to enter a tamper mode.

In one or more embodiments, the authentication comprises:
requesting a change to the power provided by the power supply using said encrypted communication; and
authenticating the power supply based on a determination by the microcontroller that the requested change in power has been received over the power supply line.

In one or more embodiments, said method comprises repeating said requesting and authenticating at time-spaced intervals during operation in the normal mode.

In one or more embodiments, said request is made independent of the microcontroller requiring a change in the power supplied by the power supply for its operation.

In one or more embodiments, the authentication comprises:
providing a challenge message to said power supply; and
receiving a response message from the power supply and wherein the validity of the response message to the challenge message provides for said authentication of the power supply.

It will be appreciated that the functionality of the optional features of the first aspect apply equally to the third aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

A possible attack scenario for a microcontroller, such as a system on a chip, SoC, is to tamper with the supply voltages provided to the microcontroller to trigger misbehavior of the device, which may lead to full or partial access to the microcontroller and possibly other devices controlled by the microcontroller. In one or more examples, in order to implement such an attack, the power supply may be exchanged with a malicious power supply which is under full control of the attacker. In one or more examples, rather than replace the power supply, a malicious power supply may be used to connect to the supply terminals of the microcontroller while the microcontroller is communicating with the genuine power supply.

Figure 1:
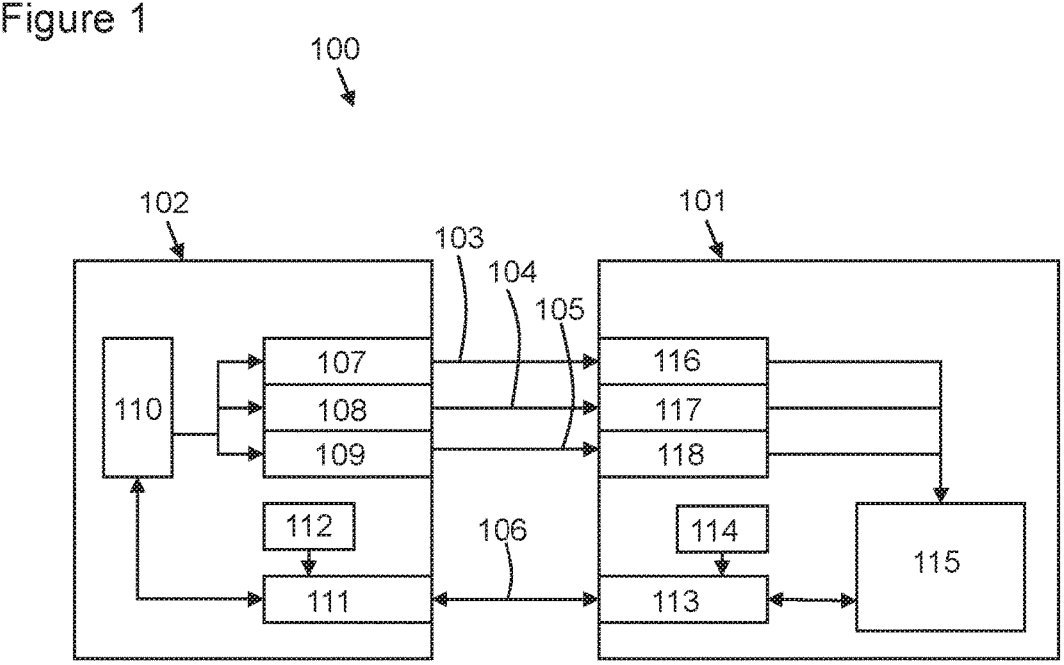
FIG. 1 shows an example embodiment of a system including an example system on a chip microcontroller and a power supply.

Example FIG. 1 shows a system 100 comprising a microcontroller 101 comprising a first integrated circuit and a power supply 102 comprising a second integrated circuit. The microcontroller in this example comprises a system on a chip, such as a i.MX8, although it will be appreciated that any microcontroller may be used. The power supply may comprise a power management integrated circuit or PMIC configured to provide regulated power to the microcontroller in response to requests.

The power supply 102 is configured to provide power to said microcontroller 101 by at least one power supply line and in this example three power supply lines are provided comprising a first, second and third power supply lines 103, 104, 105. The system 100 includes at least one communication line 106 which provides for communication between the power supply 102 and the microcontroller 101. In one or more examples, there may be more than one communication line. In one or more examples, the microcontroller may use one or more of the power supply lines to provide the function of the communication line. In such an example, appropriate filtering to separate the supplied power from the communication signalling may be required, as will be familiar to those skilled in the art.

The power supply 102 may comprise a power regulator circuit 107, 108, 109 for each power supply line. In this example, the power regulator circuits are configured to provide a different regulated voltage over each line. For example, the first voltage regulator circuit is configured to provide 1.8 V, the second voltage regulator circuit is configured to provide 2.7 V, and the third 3.3 V. It will be appreciated that other voltages may be provided. The voltage regulator circuits may be under the control of a controller 110 configured to set the voltages output by the regulator circuits 107-109. The controller 110 may be configured to receive signalling from the microcontroller over an encrypted communication path provided by encryption/decryption module 111 and a corresponding encryption/decryption module 113 of the microcontroller 101. The encryption/decryption module 111 may have access to a pre-shared key stored in a secure memory 112 for use in establishing secure communication between the power supply 102 and the microcontroller 101. The pre-shared key may be programmed into hardware at the time of manufacture, established and stored during commissioning or established and stored during a set-up procedure or obtained in use or any other way.

The microcontroller 101 or, in particular, the encryption/decryption module 113 may have access to a pre-shared key stored in a secure memory 114 for use in establishing secure communication between the power supply and the microcontroller. The pre-shared key may be programmed into hardware at the time of manufacture, established and stored during commissioning or established and stored during a set-up procedure or obtained in use or any other way. The pre-shared encryption key may be of symmetric or asymmetric type. The encryption/decryption module 113 may be configured to communicate with a controller or processor 115 of the microcontroller 101. The microcontroller 101 may comprise a first, second and third power supply terminal to receive the power supplied over the power supply lines 103, 104, 105. The processor 115 may be configured to receive a measure of the power received over one or more of the power supply lines 103, 104, 105. Accordingly, the microcontroller 101 may include a voltage or power sensor 116, 117, 118 coupled to the respective first through third power supply terminals for determining the voltage or power supplied by the power supply 102. The power supply information from said sensor(s) may be provided to the processor 115.

In one or more examples, the microcontroller 101, using said communication line 106, is configured to provide for encrypted communication between the power supply 102 and the microcontroller 101 based on the pre-shared encryption key stored in the respective memories 112, 114. The encrypted communication may be configured to provide for authentication of the power supply 102. If the power supply passes authenticated, the microcontroller 101 may be configured to operate in a normal mode and receive or continue to receive said power from the power supply 102. If the power supply fails authentication, the microcontroller 101 may be configured to enter a tamper mode in which its operation is restricted. The communication between the microcontroller 101 and the power supply 102 may be based on the i2C communication scheme.

Thus, in one or more examples, the power supply or PMIC 102 is securely coupled to the microcontroller 101 to prevent hackers from easily getting access to the power supply 102 of the microcontroller or replacing the power supply by a malicious power supply to perform attacks. An attack may comprise attempting to gain access to the microcontroller by over/under supply of power, introducing power glitches, as may be familiar to those skilled in the art.

The encrypted communication between the microcontroller 101 and the power supply may be used in one or more ways. For example, the encrypted communication may be used to:

1. Authentication of the power supply 102 at start-up to confirm that the microcontroller 101 is communicating with the power supply 102 it is pre-configured to be communicating with, wherein said pre-configuring may be performed at the time of manufacture or at a different time;

2. Provide for the transmission of encrypted control signalling between the microcontroller 101 and the power supply 102; and 3. Periodic (at regular or irregular time intervals) checks of the functionality of the power supply to ensure consistency and that the power supply terminals of the microcontroller 101 are receiving the power provided by the power supply 102 (and not that provided by an external power supply, for example).

Turning first to the periodic checks, to ensure that the microcontroller 101 is not only communicating with the intended power supply 102 but also that the power it receives is delivered from the same power supply 102, the microcontroller may be configured to repeatedly check the behaviour of the power supply 102. The checks may be performed at regular time intervals, random times, according to a predetermined schedule or at any time during a predetermined time period in which behaviour checking can be performed, such as a downtime predetermined time period or during a designated self-test predetermined time period. In one or more examples, the predetermined time period in which behaviour checking can be performed may comprise a period during normal operation, such as when the microcontroller is not under maximum load.

The microcontroller 101 may be configured to request a change to the power provided by the power supply 102 over any one or more of the power supply lines 103, 104, 105. The making of the request for the change to the supply power may be implemented using any known protocol. The request is communicated using said encrypted communication and said authentication of the power supply 102 is based on a determination by the microcontroller 101, such as by the processor 115 thereof, that the requested change in power, sensed by the sensors 116, 117, 118, has been received over the power supply lines 103, 104, 105. The microcontroller 101 may be configured to make a plurality of said requests at time-spaced intervals during operation in the normal mode to continually monitor the response of the power supply 102. It will be appreciated that the microcontroller 101 may make requests for changes in the power supplied thereto by the power supply for operational reasons to perform its function and not for reasons of security and authentication, such as by dynamic voltage scaling (DVS). However, in one or more examples, the requests for changes in the power supplied for use in authenticating the power supply may be made independent of the microcontroller 101 requiring a change in the power supplied by the power supply 102 for its operation.

The requests could be implemented by, for example, requesting a slightly higher or slightly lower voltage over one or more of the power supply lines 103, 104, 105. The slightly higher or slightly lower voltage may comprise a voltage that is within operating tolerances to ensure that the functionality provided by the microcontroller is not negatively influenced by said changed voltage of the power supply 102.

In one or more examples, the microcontroller 101 may be configured to authenticate the power supply 102 at start-up. The microcontroller 101 may be configured to, as part of a start-up routine performed when the microcontroller 101 receives power after a period of not receiving power, send encrypted communication to the power supply 102 and receive encrypted communication from the power supply and, based on the content of the communication, provide for authentication of the power supply.

As part of said encrypted communication at start-up, the microcontroller 101 may be configured to provide one or more challenge messages to said power supply 102 and receive one or more response messages from the power supply 102 in return and wherein the validity of the response message to the challenge message provides for said authentication of the power supply 102.

Whether or not authentication of the power supply 102 to the microcontroller 101 is performed at start-up, the apparatus may be configured to encrypt communication between the microcontroller 101 and power supply 102 using the pre-shared encryption key.

In one or more examples, the microcontroller 101 and the power supply 102 may be programmed with sequence counters, and the encryption of the communication between the microcontroller 101 and the power supply 102 may use said sequence counters to determine whether a received message follows said sequence counters and is not a repetition of a previous message. The use of sequence counters may be used to prevent replay attacks.

Figure 2:
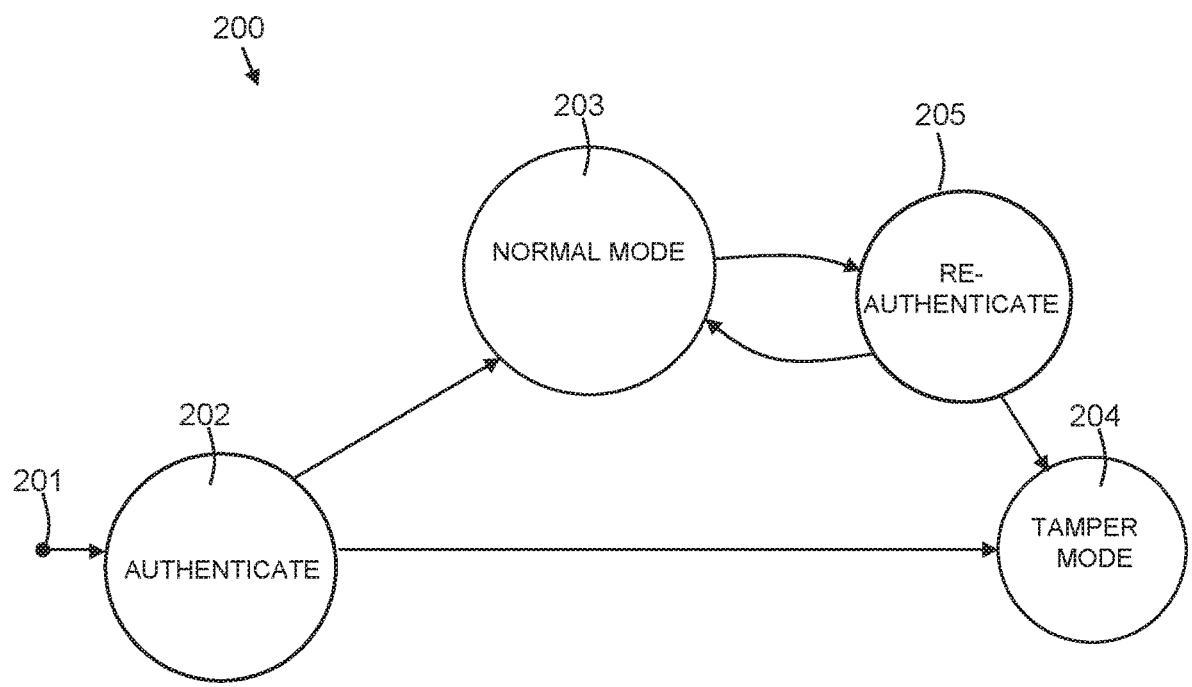
FIG. 2 shows an example state diagram.

Example FIG. 2 shows a state diagram 200 that may represent the actions and modes of the microcontroller 101. The system 100 or microcontroller 101 may start in an initialization state 201, which may be the state at start-up of the microcontroller 101. The microcontroller 101 attempts to authenticate the power supply 102 at 202. If the power supply 102 passes authentication the system 100 or microcontroller 101 may enter a normal operation mode 203. If the power supply fails the authentication then the microcontroller 101 may enter a tamper mode 204. In the normal mode 203, the communication between the microcontroller 101 and the power supply 102 may be encrypted using the pre-shared encryption key. The repeated re-authentication of the power supply 102 is shown at 205. If the power supply passes, the microcontroller 101 may return to the normal mode 203. If the power supply fails the authentication, the microcontroller 101 may enter the tamper mode 204.

The normal mode of operation 203 may comprises the microcontroller 101 operating with a first level of functionality, such as all functionality. The tamper mode of operation may comprise the microcontroller 101 operating in a safe state or may comprise the microcontroller 101 shutting down or the suspension of operation of the microcontroller 101 until a reset command is received. However, in general, the tamper mode may comprise the microcontroller 101 operating with a reduced level of functionality compared to said first level, wherein the reduced level may comprise disabling of the microcontroller 101 at least until said power supply 102 is authenticated or the system is reset, such as by user input or any other way. After a reset, the system may again attempt to authenticate the power supply.

Figure 3:
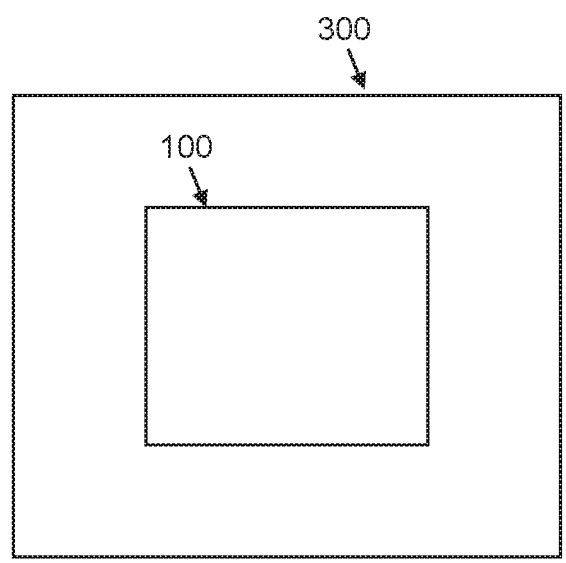
FIG. 3 shows an example automotive device.

Example FIG. 3 shows the system 100 comprising part of an automotive apparatus 300 wherein the microcontroller 101 is configured to provide functionality for said automotive apparatus. The automotive apparatus 300 may comprise a vehicle or a radar system for a vehicle. The microcontroller 101 may be configured to provide functionality for the vehicle or the radar system. It may be important to ensure the security of an automotive apparatus 300 and therefore the system 100 has particular application in automotive apparatuses 300. It will be appreciated that the system 100 also has application outside the field of automotive apparatuses and this example is not intended to limit its application.

Figure 4:
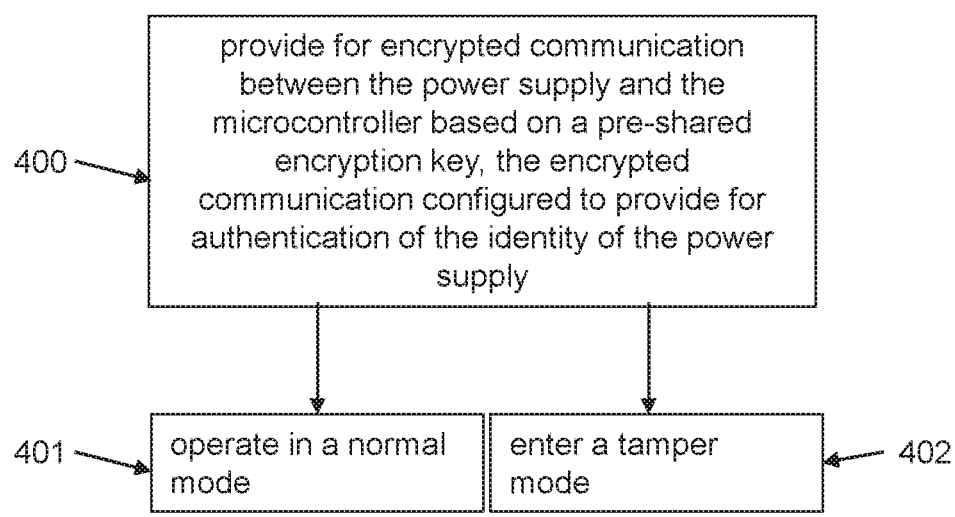
FIG. 4 shows an example method.

FIG. 4 discloses an example method of authenticating a power supply. The method comprises providing for 400, using said communication line, encrypted communication between the power supply and the microcontroller based on a pre-shared encryption key, the encrypted communication configured to provide for authentication of the identity of the power supply and, if the power supply passes authenticated 401, operating the microcontroller in a normal mode and receiving, by the microcontroller of said power from the power supply, and if the power supply fails authentication 402, causing the microcontroller to enter a tamper mode.

Step 400 may comprise:

requesting a change to the power provided by the power supply using said encrypted communication; and authenticating the power supply based on a determination by the microcontroller that the requested change in power has been received over the power supply line.

Step 400 may comprise alternatively or in addition:

providing a challenge message to said power supply; and receiving a response message from the power supply and wherein the validity of the response message to the challenge message provides for said authentication of the power supply.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A microcontroller comprising a first integrated circuit configured to receive power from a power supply comprising a second integrated circuit via at least one power input terminal and wherein at least one communication terminal provides for communication between the microcontroller and the power supply, wherein the microcontroller is configured to provide for encrypted communication between the power supply and the microcontroller based on a pre-shared encryption key, the encrypted communication configured to provide for authentication of the identity of the power supply and, when the power supply passes the authentication, the microcontroller is configured to operate in a normal mode and receive said power from the power supply, and when the power supply fails authentication, the microcontroller is configured to enter a tamper mode in which the microcontroller operates with a reduced level of functionality compared to the normal mode.

2. The microcontroller of claim 1, wherein said microcontroller is configured to request a change to the power provided by the power supply using said encrypted communication and said authentication of the power supply is based on a determination by the microcontroller that the requested change in power has been received over the power supply line.

3. The microcontroller of claim 2, wherein said microcontroller is configured to make a plurality of said requests at time-spaced intervals during operation in the normal mode.

4. The microcontroller of claim 2, wherein said microcontroller is configured to make said request independent of the microcontroller requiring a change in the power supplied by the power supply for its operation.

5. The microcontroller of claim 1, wherein said microcontroller is configured to provide a challenge message to said power supply and receive a response message from the power supply and wherein the validity of the response message to the challenge message provides for said authentication of the power supply.

6. The microcontroller of claim 5, wherein said microcontroller is configured to send said challenge message at a time of start-up of said microcontroller.

7. The microcontroller of claim 1, wherein in said normal mode, communication between the microcontroller and the power supply uses said encrypted communication.

8. The microcontroller of claim 1 wherein:

said normal mode comprises the microcontroller operating with a first level of functionality; and said tamper mode comprises the microcontroller operating with a reduced level of functionality compared to said first level.

9. The microcontroller of claim 1 wherein in the tamper mode the microcontroller is disabled to prevent its operation at least until said power supply is authenticated.

10. The microcontroller of claim 1, wherein said microcontroller comprises a system on a chip, SoC.

11. A system comprising the microcontroller and power supply of claim 1.

12. A system according to claim 11, wherein the system comprises an automotive apparatus, the microcontroller configured to provide functionality for said automotive apparatus.

13. A method of authentication between a microcontroller comprising a first integrated circuit and a power supply comprising a second integrated circuit, the power supply configured to provide power to said microcontroller by at least one power supply line and wherein at least one communication line provides for communication between the power supply and the microcontroller, the method comprising: providing for, using said communication line, encrypted communication between the power supply and the microcontroller based on a pre-shared encryption key, the encrypted communication configured to provide for authentication of the identity of the power supply and, when the power supply passes authenticated, operating the microcontroller in a normal mode and receiving, by the microcontroller of said power from the power supply, and when the power supply fails authentication, causing the microcontroller to enter a tamper mode in which the microcontroller operates with a reduced level of functionality compared to the normal mode.

14. The method of claim 13, wherein the authentication comprises:
  requesting a change to the power provided by the power supply using said encrypted communication; and
  authenticating the power supply based on a determination by the microcontroller that the requested change in power has been received over the power supply line.

15. The method claim 14, wherein the method comprises making a plurality of said requests at time-spaced intervals during operation in the normal mode.

16. The method of claim 14, wherein said making of the requests is independent of the microcontroller requiring a change in the power supplied by the power supply for its operation.

17. The method of claim 13, wherein the authentication comprises:
  providing a challenge message to said power supply; and
  receiving a response message from the power supply and wherein the validity of the response message to the challenge message provides for said authentication of the power supply.

18. The method of claim 17, wherein said sending of said challenge message is at a time of start-up of said microcontroller.

19. A system comprising a microcontroller and a power supply, wherein the microcontroller is configured to provide for secure communication between the power supply and the microcontroller based on a pre-shared encryption key, the secure communication configured to provide for authentication of the identity of the power supply, and the microcontroller is configured to enter a tamper mode in which the microcontroller operates with a reduced level of functionality compared to a normal mode of operation, when the power supply fails an authentication process.

20. The system according to claim 19, wherein the microcontroller is configured to receive power from the power supply when the power supply passes the authentication process.

* * * * *